April 15, 1947.    J. G. BINNEY    2,419,110
CHOCKING MEANS
Filed Jan. 25, 1945    2 Sheets-Sheet 2

Inventor
Joe G. Binney.

By Clarence A. O'Brien
and Harvey B. Jacobson
Attorneys

Patented Apr. 15, 1947

2,419,110

UNITED STATES PATENT OFFICE 2,419,110

CHOCKING MEANS

Joe G. Binney, New Douglas, Ill.

Application January 25, 1945, Serial No. 574,591

1 Claim. (Cl. 188—32)

My invention relates to improvements in transportation means, and more specifically to chocking means for use on railway cars in connection with motor trailer equipment.

The invention is designed with the primary object in view of providing improved equipment for transporting motor trailers on railway cars, the improvements being directed particularly toward facilitating loading of such trailers on railway cars, as well as to securing the trailer on such cars against casual displacement either laterally or longitudinally of the cars, and also against upsetting, all without prohibitively increasing cost of manufacture and maintenance of such equipment.

Other and subordinate objects, also comprehended by my invention, together with the precise nature of my improvements, and the advantages thereof, will be readily understood when the succeeding description and claim are read with reference to the drawings accompanying and forming part of this specification.

Figure 1:
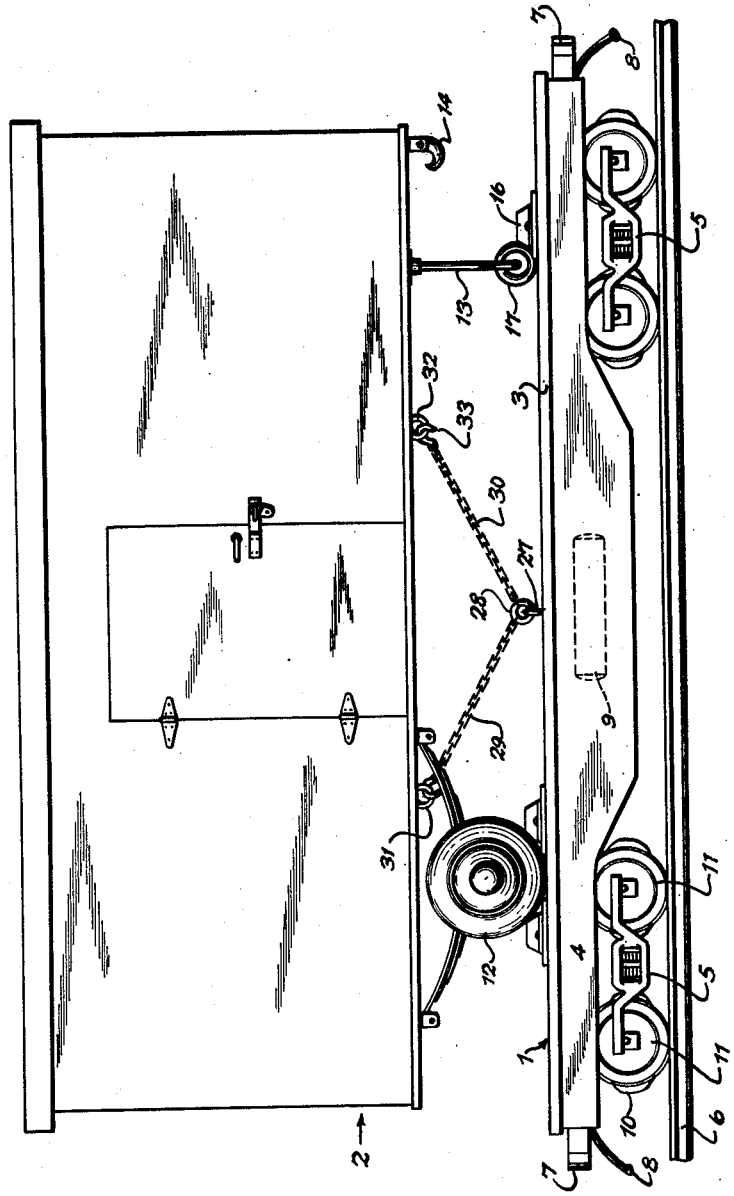
Figure 2:
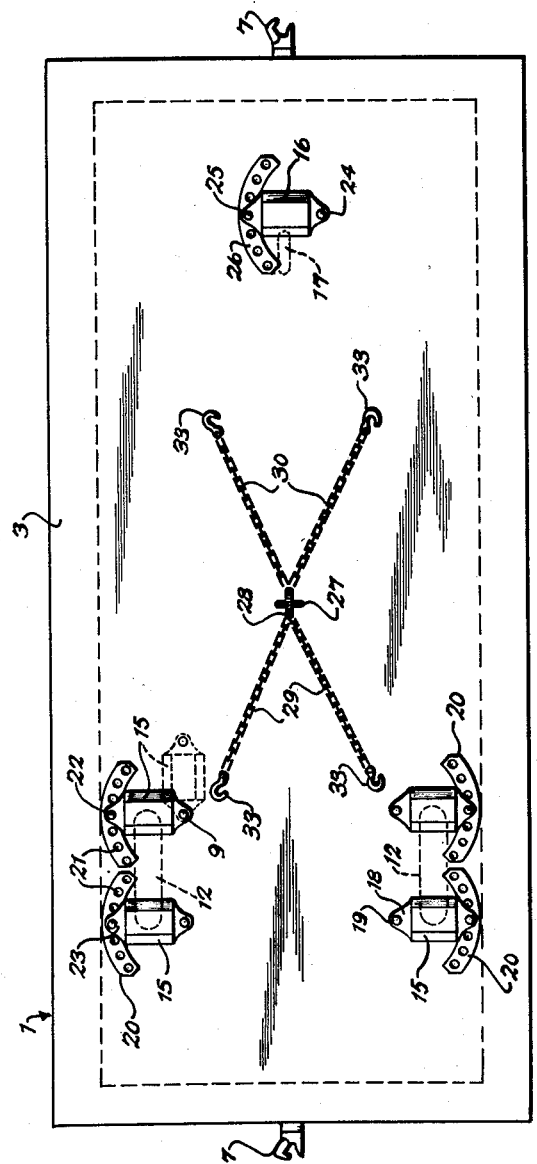

In said drawings:

Figure 1 is a view in side elevation of my invention in a preferred embodiment thereof, Figure 2 is a view in top plan with the trailer removed from the car.

Reference being had to the drawings by numerals, according to my invention, a railway car 1, for carrying a truck trailer 2, is provided, which is of the commonly designated flat-car type and embodies a flat bed 3 carried by side sills 4 supported by wheel trucks 5, the wheels of which run on the usual rails 6. The car 1 is provided with suitable end couplers 7 and air hose couplings 8 also with a brake cylinder 9 for operating brakes 10, all as conventional. A particular feature of my invention is that the wheels 11 of the trucks 5 are designed to be relatively smaller than the standard railway car wheels and the sills 4 set low on the trucks 5, all to the end that the bed 3 is disposed at a lower level with respect to the ground than the usual flat car, so that the trailer 2 may be loaded onto and unloaded from the bed 3 from a low ramp, dock, or the like, not shown.

The trailer 2 is of the closed-body, tractor-drawn type, with a single pair of rear wheels 12 and a wheel-equipped, front-supporting jack 13 which may be of any conventional form for adjustment into an out-of-the-way position when not in use. The numeral 14 designates the usual hitch for coupling the trailer 2 to a suitable tractor, not shown, for pulling the same over the road.

Pairs of elongated, bevel-sided chock blocks 15 are provided on one end of the bed 3, one pair adjacent each side of said bed, for the wheels 12, the blocks 15 being spaced apart in each pair longitudinally of said bed and extending crosswise of the bed when in use. A single chock block 16 is provided adjacent the opposite end of the bed 3 for the wheel 17 of the jack 13 between said end of the bed and said wheel. The pair of chock blocks 15 are provided with reduced ends 18 pivoted on the bed 3, as at 19. The pivots 19 of the pairs of chock blocks 15 are spaced apart upon opposite sides of the longitudinal center of the bed 3 a distance less than that obtaining between the wheels 12 so that said blocks may be swung out of chocking relation into a position between said wheels, for instance, as shown by dotted lines in Figure 2. Pairs of arcuate detent bars 20 are provided on the bed 3 for the pairs of chock blocks 15 and arranged at the outboard sides of the wheels 12 to receive, in selective longitudinally spaced apertures 21 therein, detent pins 22 inserted through suitable apertured reduced ends 23 provided on the pairs of chock blocks 15. The chock block 16 is identical with the chock blocks 15 being pivoted, as at 24, on the bed 3 and provided with a detent pin 25 coacting with a detent bar 26 identical with the detent bars 20.

Chain anchor means is provided in conjunction with the foregoing for preventing the trailer 2 from upsetting and comprising the following. An eye bolt 27 is suitably secured in the bed 3, in the approximate center thereof, with a swivel ring 28 therein to which two pairs of chains 29, 30 are suitably secured for extension toward opposite ends of the trailer 2 in upwardly inclined, divergent relation in each pair to laterally spaced front and rear pairs of U fasteners 31, 32 provided on the bottom of the trailer 2. Suitable hooks 33 are provided on the chains 29, 30 for attaching the same to said fasteners 31, 32.

As will be seen, the chains 31, 32, in addition to anchoring the trailer against upsetting, also prevent forward and rearward movement of the trailer 2 on the bed 3 when the chock blocks 15, 16 are swung into wheel-releasing positions, whereby the trailer 2 cannot roll until the hooks 33 are disengaged from the fasteners 31. Thus, a safety factor is provided reducing accident hazards, as will be manifest.

In the use of the described invention, in loading the trailer 2 onto the bed 3, the appropriate chock blocks 15 of the pairs are first moved into effective position, in a manner which will be clear, and the trailer 2 backed onto the bed 3 against said blocks, thus set. The other chock blocks 15 of the pairs are then properly positioned in front of the wheels 12. The jack 13 is then lowered, and the chock block 16 moved into chocking, or blocking, position, in front of the wheel 17. The chains 29, 30 are then attached to the fasteners 31, 32. A particular advantage of the detent bars 20 is that the chock blocks 15 may be set into either angular or straight position to chock wheels of different diameters; likewise the chock block 16 may be set into chocking relation to jack wheels 17 of different diameters, all by merely inserting the pins 22, 25, as the case may be, in selected apertures 21 or 26.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

Chocking means for a flat bed railway car comprising elongated chock blocks, means to mount said blocks in complemental pairs at opposite sides of said bed to extend crosswise of the bed in each pair with the blocks in each pair swingable into different angular positions with respect to each other to vary the chocking relation thereof, and means to lock the chock blocks of each pair in different angular positions comprising arcuate apertured detent bars, and pins carried by said blocks for extension through said apertures selectively.

JOE G. BINNEY.

REFERENCES CITED

The following references are of record in the file of this patent:

UNITED STATES PATENTS

| Number | Name | Date |
| --- | --- | --- |
| 2,159,479 | Goodwin et al. | May 23, 1939 |
| 1,828,145 | Johnston | Oct. 20, 1931 |
| 1,733,269 | Mauk et al. | Oct. 29, 1929 |